June 26, 1934.  W. E. PHILLIPS  1,964,407
METHOD AND APPARATUS FOR MAKING A SLIT FLEXIBLE TUBING
Filed Aug. 30, 1930  3 Sheets-Sheet 1
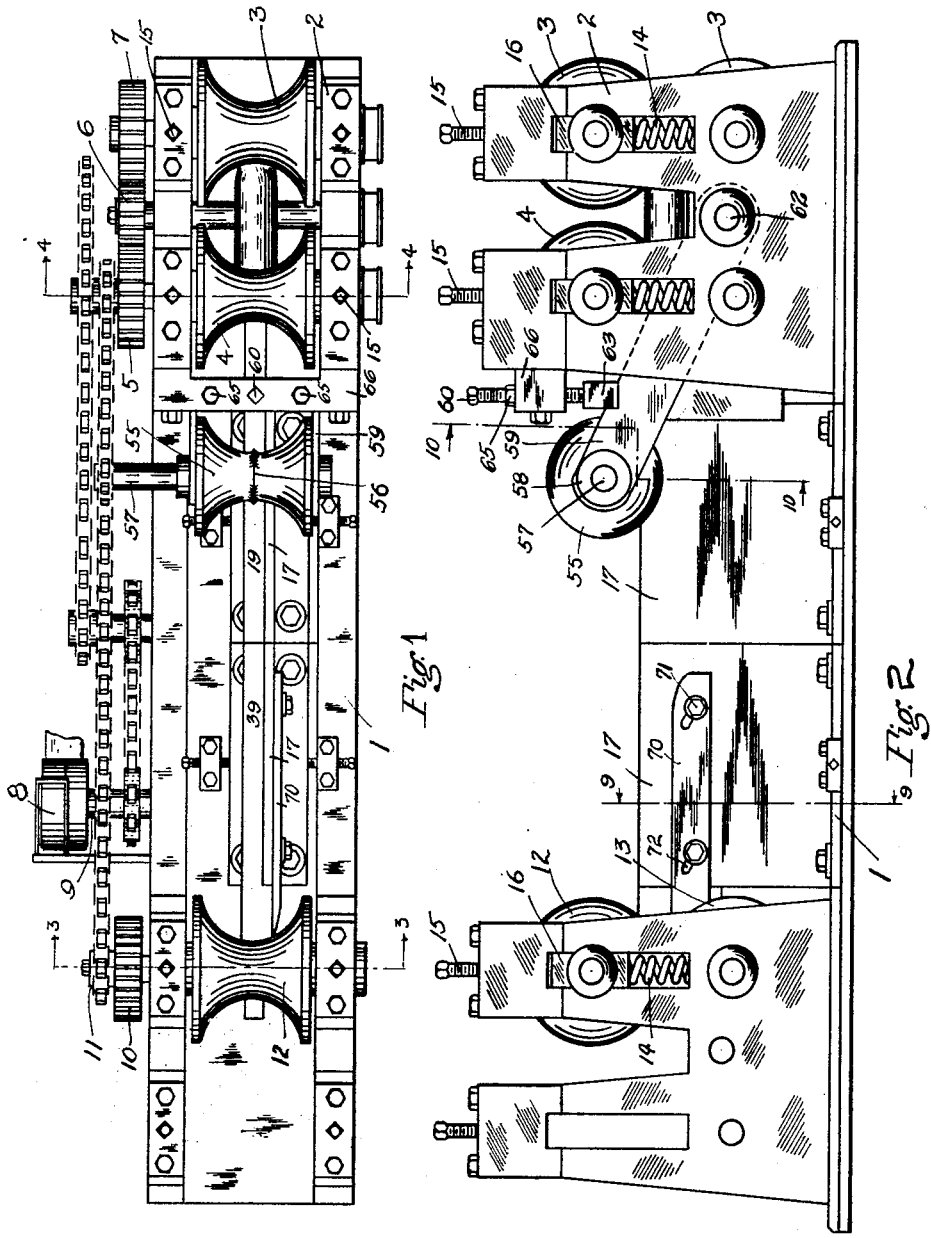
Inventor
Walter E. Phillips
By Arthur H. Van Horn
his Attorney June 26, 1934.     W. E. PHILLIPS     1,964,407
METHOD AND APPARATUS FOR MAKING A SLIT FLEXIBLE TUBING
Filed Aug. 30, 1930     3 Sheets-Sheet 2

Inventor
Walter E. Phillips
By Arthur H. Van Horn
his Attorney

June 26, 1934.   W. E. PHILLIPS   1,964,407
METHOD AND APPARATUS FOR MAKING A SLIT FLEXIBLE TUBING
Filed Aug. 30, 1930   3 Sheets-Sheet 3

Inventor:
WALTER E. PHILLIPS
By C. C. Cousins,
His Attorney

Patented June 26, 1934

1,964,407

UNITED STATES PATENT OFFICE 1,964,407

METHOD AND APPARATUS FOR MAKING A SLIT FLEXIBLE TUBING

Walter E. Phillips, Cleveland Heights, Ohio, assignor to Cleveland Metal Hose Company, Roseville, N. J., a corporation of Ohio Application August 30, 1930, Serial No. 478,938

13 Claims. (Cl. 113—33)

This invention relates to a method and apparatus for slitting flexible metallic tubing and forming the areas of the material of the tube adjacent the slit for removably interlocking engagement one side with the other.

This invention relates particularly to a method and apparatus for slitting flexible metallic tubing such as is formed from a continuous spirally wound strip in which adjacent edges of the convolutions of the strip are movably interlocked. Such tubing has been used heretofore in the manufacture of flexible hose and other conduits and is especially adapted for use in connection with gasoline filling station pumps. Another type of flexible metallic tubing which may be slit by the method and apparatus embodying my invention is that type made up of interlocking sections such as interlocked concentric rings.

It is therefore an object of my invention to produce slit flexible metallic tubing mechanically and to accurately slit such tubing in a line substantially parallel to the axis of the tube.

Another object of this invention is to slit flexible metallic tubing and simultaneously form the areas of the tube material near the walls defining the slit so that these areas may be removably interlocked one with the other.

It is a further object of my invention to continuously slit and form for interlocking engagement a length of metallic flexible tubing mechanically by power operated means whereby such tubing may be produced very economically and in large quantities for a given period of time.

Other objects and advantages of my invention will become more apparent as the following description of an embodiment thereof progresses, reference being made to the accompanying drawings in which like reference characters are employed to designate like parts throughout the same.

Figure 1 is a top plan view of an apparatus embodying my invention.

Figure 2 is a side elevation of the same.

Figure 3:
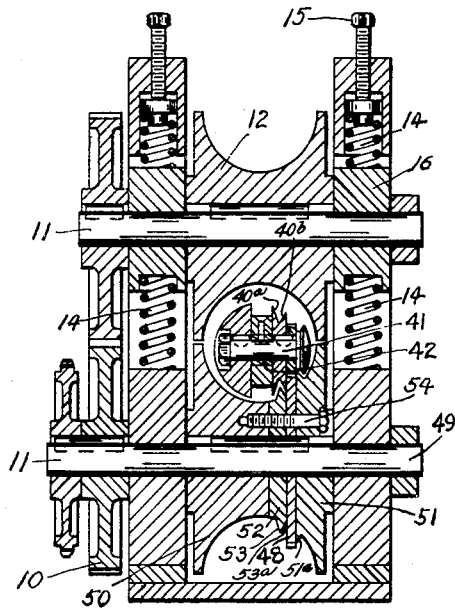
Figure 3 is a section taken on line 3—3 of Figure 1.

In carrying out my invention I provide a frame 1 which may be bolted or otherwise secured to a bed plate. Mounted on one end of the frame in a bearing support 2 are the driven upper and lower rollers 3 and 4 respectively having a tube engaging surface of proper contour to receive a flexible metallic tube therebetween. The respective lower rolls 3 and 4 are driven in the same direction through the gears 5, 6 and 7. A source of power such as an electric motor, or the like, through a belt with the pulley 8 mounted on the shaft 9, and, through suitable driving connections as indicated in Figure 1, the rolls 3 and 4 may be driven to tightly grip and propel a length of flexible metallic tubing A to the left in Figure 1. Gears 10 mounted on the shafts 11 are also connected with the shaft supporting the gear 5 so that power may be transmitted to drive the rolls 12 and 13 mounted at the left hand end of the frame in Figure 1.

Figure 7:
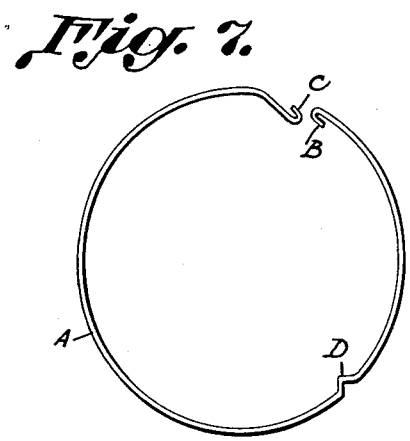
Figure 7 is an end elevation showing the tubing as it appears when completely finished.
Figure 8:
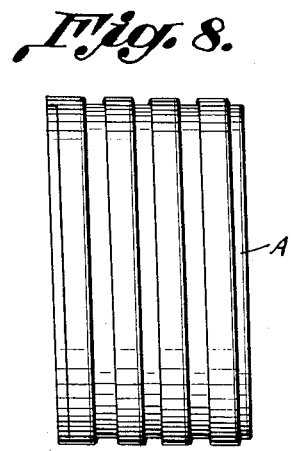
Figure 8 is a composite view of one type of tubing operated upon by the machine, showing a portion of tubing in side elevation.
Figure 8A:
Figure 8a is a fragmentary detail in section of the tubing shown in Figure 8.
Figure 11:
Figure 11 is a fragmentary detail in vertical section taken approximately on line 11—11 of Figure 10, looking in the direction indicated by the arrows.

As shown by Figures 7 the tubing comprises a main portion A which is slit to form edges B and C. The edges B and C are then formed with hook portions which may be interlocked. A depression or trough D is then formed in the tube A as hereinafter described. The depression D serves in effect as a hinge to permit the edges B and C to be more easily locked or opened.

It will be noted that the upper rolls 3, 4 and 12 float in the bearing blocks and that variable pressure may be applied to these rolls by means of the relatively heavy coil springs 14 engaging the floating bearings 16. These rolls may be adjusted downwardly against the compression of the springs by simply turning the screws 15 mounted in the supports. In this manner the pressure of the rolls against the tube A as it passes therebetween may be adjusted to cause the rolls to grasp the tube firmly and propel it from right to left in Figures 1 and 2 as the rolls are rotated.

I have provided means between the rolls at opposite ends of the frame for separating the slit portions of the tubing as it has been cut in its travel through the machine. This means is indicated at 17 and includes one or more plates supported on the frame of the machine extending upwardly into the path of movement of the tube A so that it intersects and extends into the tube as the tube passes thereover. These plates also are employed to support the shanks of the dies shown in detail in Figures 5 and 6, so that they may extend in opposite directions along the path of travel of the tube; the tube having been slit, the severed edges B and C engage opposite sides of the plates 17.

As the slit tubing A leaves the die 22 one edge B thereof bears against an extension 18 on the plate 17. At the same time the opposite edge C of the tubing bears against an angular extension 19a on the shaft 19. As the tubing A progresses the edges B and C are separated by the extensions 18 and 19a. The object of spreading the edges B and C is so that they will not jam against the end of the plate 17. When the tubing A is slit the resiliency of the metal tends to force the edges B and C together. When the plate 17 is disposed between the edges B and C the edges B and C lie close to and bear against or engage the plate 17. The edges B and C will normally continue to bear snugly against the plate 17 but in order to prevent any slippage of the tubing A, guide members 70, hereinafter described, are used to guide the edges B and C into the secondary forming dies.

Figure 4:
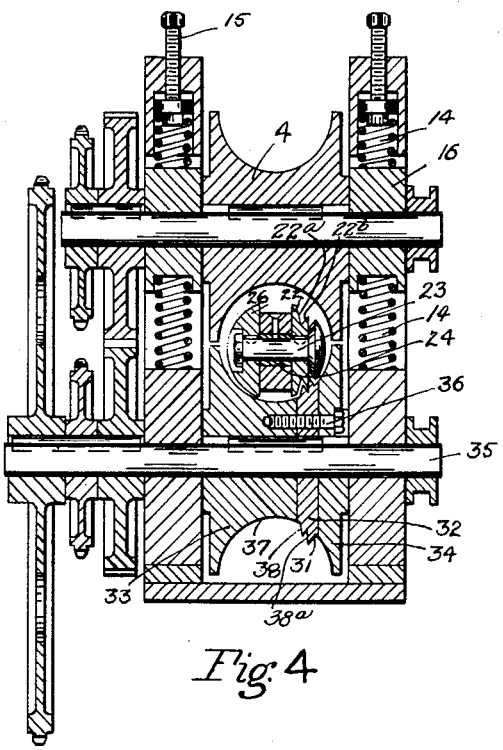
Figure 4 is a section taken on line 4—4 of Figure 1.
Figure 5:
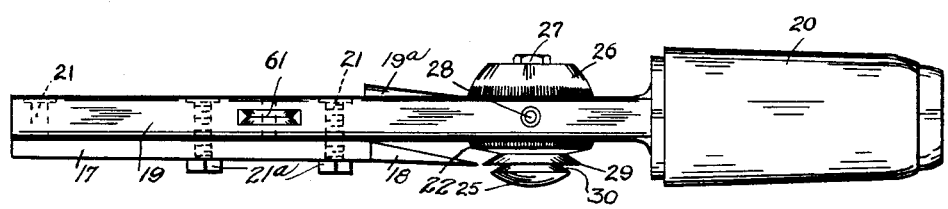
Figure 5 is a top plan view of a forming and slitting die and mandrel used in connection with my invention and forming a part thereof.

In Figure 5 I have illustrated a forming and cutting die forming a part of my invention. The die is carried on a shank 19 extending longitudinally of the plates 17 and having a mandrel head 20 extending to the right in Figure 1. The mandrel and die receive thereover the flexible tube A which is to be slit and the edges formed for interlocking engagement. The head 20 is preferably slightly tapered, and is carried by the shank 19 which is provided with suitable bolt holes 21 in which are disposed bolts 21a to secure the shank 19 to the plates 17. Intermediate the ends of the shank and preferably just beyond the mandrel head 20 is located a slitting and forming die 22 rotatably mounted on a stub shaft 23 removably carried by the shank 19. This shaft is mounted for rotation in a bearing 24 and is provided at one end with an enlarged head 25 constituting a forming die when the parts are assembled as shown in Figure 4. The cutting and forming die 22 is keyed to the shaft 23 adjacent the forming die 25. A core member 26 is also keyed to the shaft 23 near the opposite end and bolt 27 is provided to prevent relative axial movement between the core member and the shaft and further to prevent axial movement of the shaft in its assembled position. A set screw 28 serves to fix the bearing 24 in proper position to support the shaft. It will be noted that the outer walls of the core member 26 and the forming die 25 are shaped to engage the portions of the inner walls of the tube in the vicinity of the slit as the tube passes thereover. In this manner the walls may be firmly grasped at these points during the slitting and forming of the tube wall. It will be noted that the forming and cutting die 22 is provided with an annular groove the walls of which converge inwardly toward the axis of the die forming with the outer wall of the die a sharp annular cutting edge 29, the converging walls constituting an annular forming die for that portion of the tube material C adjacent one of its slit edges. The headed portion of the forming die 25 converges inwardly toward the axis as indicated at 30 to form with the wall 31 of the complementary forming and cutting die member 32, a composite forming die for forming that portion of the tube material comprising the area of the other slit wall B of the tube.

The lower roller 3 (Fig. 4) preferably comprises a main roller portion 33 and a complementary portion 34 between which is held the complementary forming and cutting die 32. The die 32, like the parts 33 and 34 is keyed to the roller shaft 35 for rotation therewith and these parts are further removably secured together by means of a bolt 36. When these parts are assembled, it will be noted that the forming and cutting die 32 extends annularly beyond the substantially semicircular wall 37 of the composite roller, and cooperates with the cutting and forming die 22 on the shaft 23 to slit and form the tube material adjacent the slit into continuous interlocking areas as the tube passes between these dies. The complementary die section 32 has an annular portion 38 which projects into the annular groove of the die 22 as shown in Figure 4 to assist in the forming of the tube wall. As the tube A is slit the wall 22a of the die 22 co-operates with the wall 38 of the die 32 to bend the portion of the tube A adjacent the edge C toward the inside. At the same time the wall 22b co-operates with the wall 38a to turn the edge C outward to form a hook.

Figure 10:
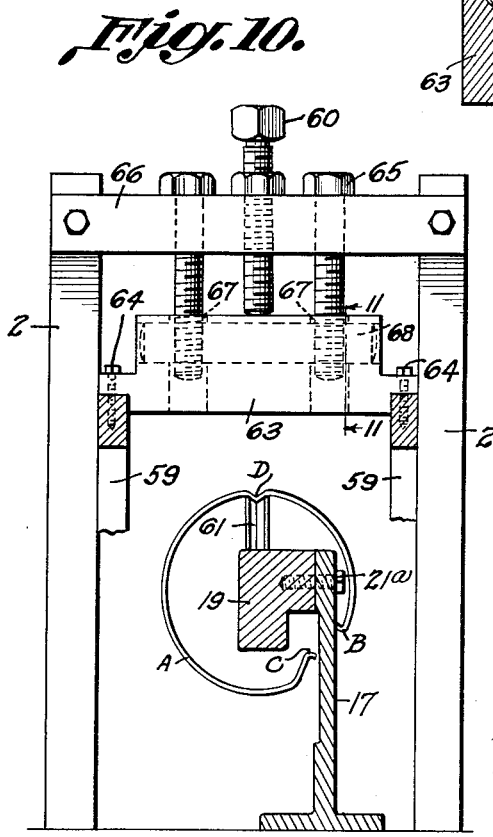
Figure 10 is a vertical section taken approximately on line 10—10 of Figure 2, looking in the direction indicated by the arrows, the roller 55 being omitted.
Figure 9:
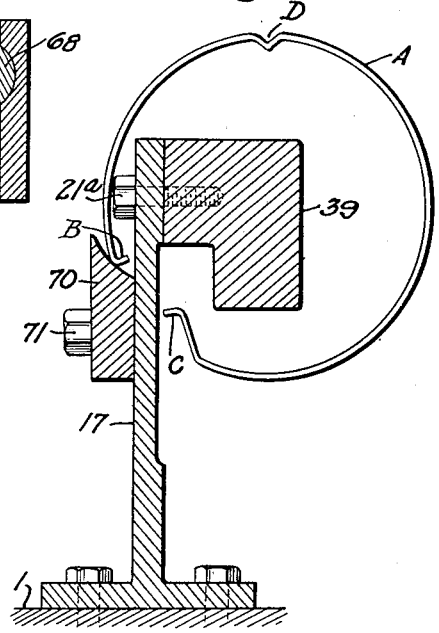
Figure 9 is a vertical section taken approximately on line 9—9, of Figure 2, looking in the direction indicated by the arrows.

Simultaneously, the walls 30 and 31 form a hook on the opposite edge B of the tube A. When the tubing leaves the lower roller 3 the edges B and C are not entirely formed but are as shown in Figures 9 and 10.

Figure 6:
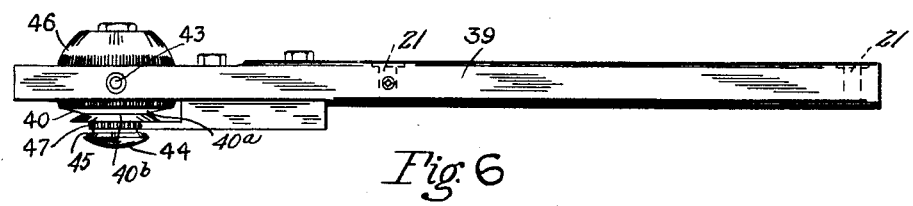
Figure 6 is a top plan view of another forming die forming a part of my invention.

In Figure 6 I have illustrated another die mounted on a shank 39 which is likewise supported by the plates 17, the die being in substantial alignment with the die shown in Figure 5 and adapted to receive the tube thereover as the tube passes through the machine. The shank 39 is secured to the plate 17 by means of bolts 21a disposed in the holes 21 in the shank 39. The shank 39 carries near one end thereof a forming die 40 illustrated in Figure 6. In Figure 3 this die is shown in cross section and is substantially the same construction as the die 22. A shaft 41 is rotatably mounted in a bearing 42 carried by the shank 39, a set screw 43 being provided to removably lock the bearing in the shank. The die 40 comprises a member having an annular forming groove about its periphery the walls of the groove converging toward the axis of the die. One end of the shaft terminates in a head and forming die 44 having an inwardly inclined surface 45 for engaging the previously formed material of the tube along the slit. The wall 45 is inclined more sharply than the wall 30 of the die 25 so as to further bend the tube material along its slit edge B. As in the case of the forming and cutting die 22, I have also provided, in this instance, a core 46 for engaging the tube material near the other of its slit edges, the head 44 likewise engaging the tube material near the first named slit edge C for clamping the tube material between the cooperating core members and the roller surface. Keyed to the shaft 41 is a pinion 47 which engages another pinion or gear 48 keyed to the shaft 49 carrying the lower roller 13. The roller 13 is preferably composed of complementary sections 50 and 51 keyed to the shaft and clamping therebetween a complementary die 52 and the gear 48 as shown in Figure 3. A bolt 54 serves as the means for securing these parts together on the shaft against relative axial movement. The complementary die member 52 is provided with an outwardly projecting annular die face having outwardly converging die forming walls 53 which are adapted to enter the annular groove in substantially spaced relation, and, cooperating with a wall 40a, firmly grip and form the tube material near one of the edges of the slit as it passes therebetween.

As the tube which has already been slit passes between the rollers 12 and 13 as in Figure 3, and between the cooperating die members 40 and 52 it is firmly gripped therebetween and by virtue of the driving connections through the drive gears, the shaft 49 and the pinions 48 and 47, the tube is conveyed between the die members where the pre-formed areas are further formed and then the tube is passed to a point beyond the machine.

In this secondary forming operation the edge C is further bent between the wall 40b on the die 40 and the wall 53a on the die 52 to more sharply define the hook on the edge C. At the same time, the wall 45 co-operates with the wall 51 to more sharply form the hook on the edge B. It will be noted that in the finished tubing as shown in Figure 7 the edge C is bent slightly inward so that the edges B and C may be more readily engaged or disengaged. After the tubing A has been applied to any desired article, if it is desired to have the edges B and C permanently locked they may be forced together into sealing engagement in any suitable manner.

I have provided a driving connection between the rollers 12 and 13 in order to prevent buckling of the tube between these rollers and the initial rollers 3 and 4 located near the other end of the machine, the former rollers assisting the latter rollers in passing the tube through the apparatus.

I have provided means intermediate the forming dies 22 and 40 for depressing a limited area of the tube material continuously as the tube passes through the apparatus so that the depressed portion of the tube is in the nature of a continuous channel or trough extending axially of the tube. This trough is to permit the formed edges to be more readily interlocked and separated when the tube is finished. In carrying out this phase of my invention I provide a roller 55 having an annular outwardly extending projection or die 56. The roller 55 is keyed to a shaft 57 which is rotatably mounted in suitable bearing 58 carried by the arms 59. At 60 I have indicated means for positioning the roller with respect to the tube, and for exerting a downward pressure upon the roller and the tube.

The adjusting means is best shown in Figure 10. The arms 59 are pivoted on the housing of the shaft 62. Disposed between the arms 59 is an adjusting block 63 connected to the arms 59 by bolts 64. Adjusting bolts 65 are disposed through a cross-member 66 on the frame 2. The bolts 65 project into the block 63 to raise or lower the block. The set screw 60 bears against the block 63 and limits its upward movement, so that the bolts 65 in conjunction with the screw 60 will adjust the roller 55 vertically to any desired position.

Since the arms 59 are pivoted the path of movement of the block 63 is an arc. In order to prevent the bolts 65 from binding, openings 67 are formed in the block 63 to receive the bolts 65. A cylindrical, rotatable core 68 is disposed in the block 63 through which core the bolts 65 are threaded so that the core 68 moves vertically even though the block 63 moves in a slight arc.

Cooperating with the roller 55 is a complementary rotary die 61 which is mounted to freely rotate in an opening formed in the shank 19. The roller 61 projects sufficiently above the top surface of the shank 19 to engage the inner tube wall, and its periphery is formed with inwardly inclining walls which cooperate with the annular die 56 of the roll 55 to form a continuous axially disposed trough in the tube material as it passes between the die 56 and the inclined walls of the die roller 61.

In my copending application Ser. No. 426,542, filed February 7, 1930, I have disclosed a type of flexible tube which may be made with this apparatus and the longitudinal groove disclosed in this application illustrates the manner in which the tube material may be depressed by the action of the cooperating rolls 55 and 61.

I have provided means for guiding the tube after it is slit by the cutting die 22 and during its travel from this die to the die 40. This means includes an adjustable guide plate 70 secured to one of the plates 17 by means of bolts 71 passing through the inclined slots 72. One of these guide plates may be placed on each side of one of the plates 17 and adjusted to properly guide the slit tube as it is being fed to the secondary forming die 40. As shown in Figure 9 the plate 70 is provided with an inwardly curved upper face which bears against the edge B of the tube A. In this way the edge B is maintained against the plate 17 so as to be properly guided to the secondary forming die.

In the operation of my apparatus, a length of flexible tubing to be slit is fed over the mandrel head 20 and between the rolls 3. These rolls are driven and firmly grip the tube to pass it over the mandrel and between the rolls 4 where the tube is slit and simultaneously formed along its slit edges for interlocking engagement one edge with the other. In passing between the rolls 4 the cutting edge 29 of the die 22 slits this tube material against the face of the die 32. Substantially simultaneously with this slitting of the tube material the cooperating faces 30 and 31 of the dies 22 and 32 bend or form one edge B of the tube inwardly of the tube. At the same time the tube material at the opposite edge C of the slit is depressed inwardly between the inwardly converging annular walls of the die 22, by means of the male die faces 38 on the die 32.

As the slit and partially formed tube passes from the dies 22 and 32 it is spread slightly by the members 18 and 19a, the slit and formed edges B and C engaging opposite sides of the plates 17. As the tube moves forwardly its upper portion passes between the troughing dies 56 and 61 to form an axially extending depression or trough in the tube material intermediate the slit edges. This continuous trough permits the tube to be more easily spread apart and increases the ease with which the interlocking edges, when completely formed, may be interlocked or separated. The tube continues its travel to the left in Figs. 1 and 2, and, passing over the shank 39, is fed between the rolls 12 and 13 which are likewise driven. The tube thus passes over the die 40 where the previously formed edges are further bent or formed by means of the cooperating die faces of the dies 40 and 52. The die 40 is driven through the pinions 47 and 48 and the driven shaft 49. This further assists in conveying the tube through the rolls and minimizes the danger of the tube buckling between the forward and finishing dies.

The finished slit and formed tubing length may be deposited on any suitable conveying means as it leaves the machine.

By my invention slit interlocking tubing may be made continuously by mechanical means and at considerable speeds. I have made tubing by my method and apparatus embodying my invention at the rate of 20 feet per minute and such tubing may be made at even faster rates.

Various changes may be made in the details of construction and arrangement of parts without departing from the spirit of the invention or the scope of the appended claims.

I claim:

1. The method of making slit flexible metallic tubing which includes simultaneously slitting the tube material axially and partially forming the areas of the tube material adjacent the slit for interlocking engagement one with the other, depressing a portion of the slit tube to form an axial trough therein, and then subsequently completing the forming of said areas.

2. The method of making slit flexible metallic tubing which includes simultaneously slitting the tube material from the interior of the tube and partially forming the areas of the tube material adjacent the slit for interlocking engagement one with the other, and then subsequently completing the forming of said areas.

3. An apparatus for making slit flexible metallic tubing including cooperating slitting and forming die members adapted to slit a flexible tube and simultaneously partially form the areas adjacent the slit for interlocking engagement one with the other, and forming dies for completing the forming of said interlocking areas.

4. An apparatus for making slit flexible metallic tubing including cooperating slitting and forming die members adapted to slit a flexible tube and simultaneously partially form the areas adjacent the slit for interlocking engagement one with the other, forming dies for completing the forming of said interlocking areas and means intermediate said partially forming dies and said last named dies for deforming the tube material along a restricted longitudinal area.

5. An apparatus for making slit flexible metallic tubing including cooperating slitting and forming die members adapted to slit a flexible tube and simultaneously partially form the areas adjacent the slit for interlocking engagement one with the other, forming dies for completing the forming of said interlocking areas, and driven means for propelling the tube over said dies.

6. An apparatus for making slit flexible metallic tubing including cooperating slitting and forming die members adapted to slit a flexible tube and simultaneously partially form the areas adjacent the slit for interlocking engagement one with the other, forming dies for completing the forming of said interlocking areas, and driven means for propelling the tube over said dies, and exerting radial pressure on the tube while it is being slit and formed.

7. An apparatus for making slit metallic tubing including cooperating slitting and forming die members, driven tube propelling rolls for feeding a length of flexible tubing between the rolls and said die members and means for exerting a radial pressure on said tube material as it passes between the rolls and the die members.

8. An apparatus for making slit metallic tubing including cooperating slitting and forming die members, driven tube propelling rolls for feeding a length of flexible tubing between the rolls and said die members, said dies slitting and partially forming the tube material, and driven cooperating forming die members for completing the forming of the tube material for interlocking engagement.

9. An apparatus for making slit metallic tubing including cooperating slitting and forming die members, driven tube propelling rolls for feeding a length of flexible tubing between the rolls and said die members, means for exerting a radial pressure on said tube material as it passes between the rolls and the die members, and driven means for depressing a portion of the tube material along a relatively narrow longitudinal path.

10. An apparatus for making slit metallic tubing including cooperating slitting and forming die members, driven tube propelling rolls for feeding a length of flexible tubing between the rolls and said die members, means for exerting a radial pressure on said tube material as it passes between the rolls and the die members, driven means for depressing a portion of the tube material along a relatively narrow longitudinal path, and a guide for the slit tube, whereby said slit tube may be fed between said last named forming dies to properly engage the partially formed areas with the die faces of said last named die members.

11. An apparatus for making slit metallic tubing including cooperating slitting and forming die members, driven tube propelling rolls for feeding a length of flexible tubing between the rolls and said die members, means for exerting a radial pressure on said tube material as it passes between the rolls and the die members, said dies slitting and partially forming the tube material, driven cooperating forming die members for completing the forming of the tube material for interlocking engagement, and driven means for depressing a portion of the tube material along a relatively narrow longitudinal path.

12. An apparatus for making slit flexible metallic tubing including co-operating slitting and forming die members adapted to slit a flexible tube and partially form the areas adjacent the slit for interlocking engagement one with the other, and forming dies for completing the forming of said interlocking areas.

13. An apparatus for making slit flexible metallic tubing comprising co-operating die members to slit a flexible tube and form the areas adjacent the slit into co-operable hook portions and means to feed a flexible tube to the die members.

WALTER E. PHILLIPS.